United States Patent
Kamiyama et al.

[11] Patent Number: 6,158,473
[45] Date of Patent: Dec. 12, 2000

[54] BRANCH PIPE LINER BAG AND PIPE LINING METHOD

[75] Inventors: Takao Kamiyama, Hiratsuka; Yasuhiro Yokoshima, Ibaraki-ken; Shigeru Endoh, Yasato-machi; Hiroyuki Aoki, Tokorozawa, all of Japan

[73] Assignees: Shonan Gosei-Jushi Seisakusho K.K., Hiratsuka; Yokoshima & Company, Ibaraki-ken; GET INC., Tsukuba; OAR Company, Tokorozawa, all of Japan

[21] Appl. No.: 09/368,300

[22] Filed: Aug. 3, 1999

[30] Foreign Application Priority Data

Aug. 6, 1998 [JP] Japan .................. 10-223061

[51] Int. Cl.⁷ .................................................. F16L 55/16
[52] U.S. Cl. .............................. 138/98; 138/97; 264/269; 156/94
[58] Field of Search ......................... 138/98, 97; 264/269; 156/94, 98

[56] References Cited

U.S. PATENT DOCUMENTS

| | | | |
|---|---|---|---|
| 4,724,108 | 2/1988 | Jurgenlohmann et al. | 138/98 |
| 4,986,314 | 1/1991 | Himmler | 138/97 |
| 5,040,922 | 8/1991 | Himmler | 138/97 |
| 5,044,824 | 9/1991 | Long, Jr. et al. | 156/287 |
| 5,329,063 | 7/1994 | Endoh | 138/97 |
| 5,340,160 | 8/1994 | Meijers et al. | 285/55 X |
| 5,451,284 | 9/1995 | Ikeda et al. | 139/97 |
| 5,454,401 | 10/1995 | Kamiyama et al. | 138/97 |
| 5,566,719 | 10/1996 | Kamiyama et al. | 138/98 |
| 5,598,873 | 2/1997 | Kamiyama et al. | 138/97 |
| 5,692,543 | 12/1997 | Wood | 138/97 |
| 5,944,058 | 8/1999 | Kamiyama et al. | 138/98 |

*Primary Examiner*—Patrick Brinson
*Attorney, Agent, or Firm*—Knobbe, Martens, Olson & Bear, LLP

[57] ABSTRACT

A branch pipe liner bag immune to damage caused by a cutter is provided. In the branch pipe liner bag having a flange formed at an end of a hardenable resin impregnated bag which comprises a tubular resin-absorbent material impregnated with an unhardened liquid hardenable resin, a cylindrical anti-piercing protector 3 is embedded adjacent to the flange. According to a pipe lining method implemented using the branch pipe liner bag according to the present invention, the branch pipe liner bag adjacent to the flange is, after a branch pipe is lined, protected by the anti-piercing protector, and therefore, in a piercing work thereafter of a main pipe liner bag, the branch pipe liner bag is immune from damage caused by a cutter, thereby eliminating a problem such as infiltration of the underground water into the main pipe from a damaged portion.

16 Claims, 8 Drawing Sheets

BRANCH PIPE LINER BAG AND PIPE LINING METHOD

BACKGROUND OF THE INVENTION

1. Field of the Invention

The present invention relates to a branch pipe liner bag for lining an inner wall of a branch pipe which becomes too old to perform properly and a pipe lining method which may be implemented using the branch pipe liner bag and a main pipe liner bag.

2. Description of the Related Art

When a pipe-line laid underground such as a sewage pipe or the like becomes defective or too old to perform properly, the pipe is repaired and rehabilitated employing a pipe lining method for lining the inner wall thereof without being dug out from the underground. This non-digging method of repairing an underground pipe has been known and practiced commonly in the field of civil engineering.

The pipe lining method utilizes a pipe liner bag made of a flexible resin-absorbent material, having the outer surface thereof covered with a highly air-tight film, impregnated with an unhardened liquid hardenable resin. The pipe liner bag is turned inside out to be inserted deeper into the pipe-line (this manner of insertion shall be called "everting" hereafter) by pressurized fluid, and then the pipe liner bag is pressed against the inner peripheral surface of the pipe-line, and while the state remains, the pipe liner bag is heated or otherwise processed to harden the hardenable resin impregnated therein, thereby lining the inner peripheral surface of the pipe-line with the hardened pipe liner bag, thus repairing the pipe-line.

By the way, the pipe lining method described above can be applicable similarly to a branch pipe of a sewage pipe and the like joining a main pipe thereof, but the inventors of the present invention have proposed a branch pipe lining method for lining the branch pipe using a branch pipe liner bag having a flange formed at one end thereof. In the branch pipe lining method, while a flange of a branch pipe liner bag is bonded to the circumference of a branch pipe opening of a main pipe, the branch pipe liner bag is everted (i.e. turned inside out) into the branch pipe from the main pipe toward the ground surface by pressurized fluid to be bonded to the inner wall of the branch pipe, and while the state is being kept, the branch pipe liner bag is heated or otherwise processed to have a hardenable resin impregnated therein hardened.

Therefore, if a main pipe is lined with a main pipe liner bag by the above-described method after a branch pipe is lined by the above-described branch pipe lining method, an opening of the branch pipe to the main pipe (a branch pipe opening) is blocked by the main pipe liner bag, thereby requiring a boring work to be done for the main pipe liner bag blocking the branch pipe opening.

As a main pipe of a size in a diameter of 800 m/m or less is too narrow for a man to enter, it is necessary to operate by remote operation from the ground surface a piercing robot introduced into the main pipe to drive a cutter for piercing the main pipe liner bag blocking the branch pipe opening.

However, piercing the main pipe liner bag by remotely operating the piercing robot requires expertise and skill, and a flange and other portions of the branch pipe liner bag may be damaged by the cutter, thereby causing a problem such as infiltration of the underground water into the main pipe from the damaged portions. More specifically, depending on how the branch pipe is connected with the main pipe, damage of the branch pipe liner bag may be unavoidable.

OBJECTS AND SUMMARY OF THE INVENTION

The present invention has been made in view of the problems mentioned above, and it is an object of the present invention to provide a branch pipe liner bag capable of reliably eliminating damage caused by a cutter.

It is another object of the present invention to provide a pipe lining method capable of piercing a main pipe liner bag without damaging the branch pipe liner bag.

To achieve the above objects, according to a first aspect of the present invention, there is provided a branch pipe liner bag with a flange formed at one end of the hardenable resin impregnated bag comprising a tubular resin-absorbent material impregnated with an unhardened liquid hardenable resin, which has a cylindrical anti-piercing protector mounted on or embedded adjacent to the flange.

In one embodiment of the first aspect, the anti-piercing protector comprises metal, ceramic, metallic fiber, carbon fiber, or Kevlar fiber.

In another embodiment of the first aspect, height of the anti-piercing protector is set at 3 mm or higher.

In a further embodiment of the first aspect, the anti-piercing protector has a protrusion protruding to the inside of the main pipe, after the branch pipe is lined.

In a yet further embodiment of the first aspect, the anti-piercing protector has a protrusion protruding toward the branch pipe, after the branch pipe is lined.

In a still yet further embodiment of the first aspect, the tubular resin-absorbent material comprises unwoven fabric, one end thereof is folded, the folded portion is broadened out, the broadened-out portion is impregnated with a hardenable resin which is hardened to form a flange in a shape of arcuate curvature along the inner peripheral surface of the main pipe, the outer surface of the tubular resin-absorbent material is covered with a highly air-tight covering material, the tubular resin-absorbent material is impregnated with a hardenable resin, and the covering material is extended at least 0.5 mm toward the flange from the boundary of the tubular resin-absorbent material with the flange.

According to a second aspect of the present invention, there is provided a pipe lining method comprising the steps of forming a flange at one end of a hardenable resin impregnated bag comprising a tubular resin-absorbent material impregnated with unhardened liquid hardenable resin, lining a branch pipe using a branch pipe liner bag having a cylindrical anti-piercing protector mounted on or embedded adjacent to the flange, lining a main pipe using a main pipe liner bag made of a tubular resin-absorbent material impregnated with an unhardened liquid hardenable resin, and piercing a portion of the main pipe liner bag blocking a branch pipe opening.

Thus, according to the above-mentioned pipe lining method implemented using the branch pipe liner bag as above-described, as the branch pipe liner bag adjacent to the flange is protected by the anti-piercing protector after a branch pipe is lined, the branch pipe liner bag is immune from damage caused by a cutter in a piercing work thereafter with the main pipe liner bag, thereby eliminating a problem such as infiltration of the underground water into the main pipe from the damaged portion.

The above and other objects, features, and advantages of the present invention will become apparent from the following detailed description of the preferred embodiments thereof when read in conjunction with the accompanying drawings.

DESCRIPTION OF THE PREFERRED EMBODIMENTS

The present invention will hereinafter be described in connection with several preferred embodiments thereof with reference to the accompanying drawings.

Figure 1:
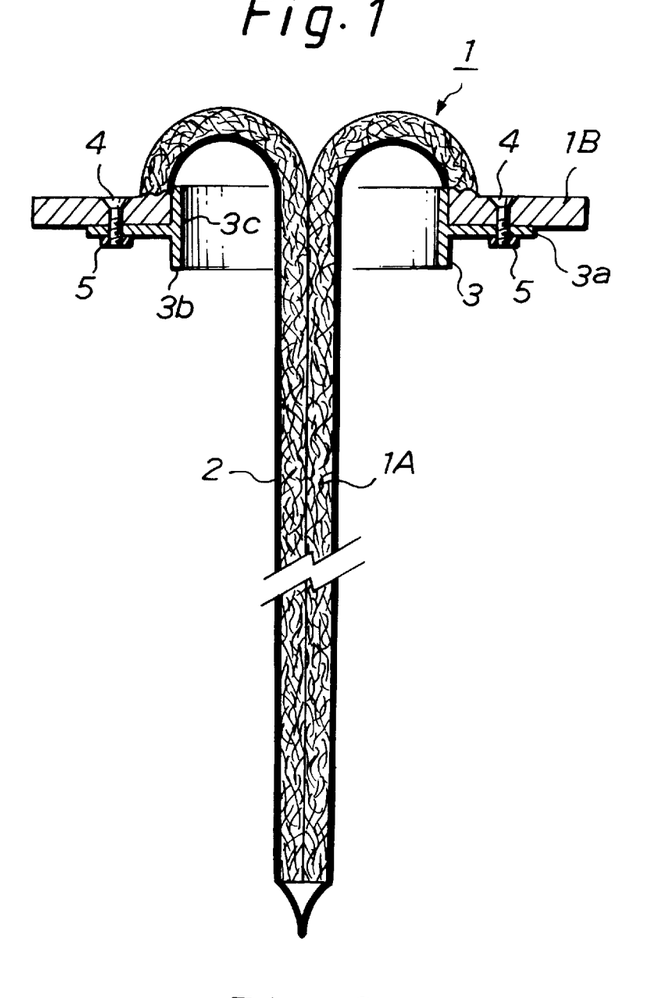
FIG. 1 is a cross-sectional view of a branch pipe liner bag according to the present invention.
Figure 2:
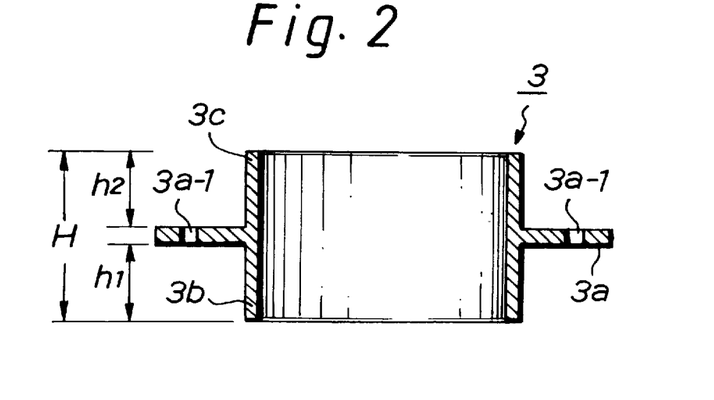
FIG. 2 is a detailed cross-sectional view of an anti-piercing protector.

FIG. 1 is a cross-sectional view of a branch pipe liner bag, and FIG. 2 is a cross-sectional view of an anti-piercing protector, according to the present invention.

The branch pipe liner bag 1 as illustrated in FIG. 1 has a flange 1B formed by hardening an outwardly folded end of a hardenable resin impregnated bag 1A, which comprises a tubular resin-absorbent material impregnated with an unhardened liquid hardenable resin, an entire outer surface of the hardenable resin impregnated bag 1A and a portion (inner peripheral surface) of a flange 1B linking an outer surface of the hardenable resin impregnated bag 1A which is covered with a highly air-tight plastic film 2, and a cylindrical anti-piercing protector 3 which is mounted on an outer surface (downward surface of FIG. 1) of the flange 1B. Meanwhile, the end of the hardenable resin impregnated bag 1A of the branch pipe liner bag 1 is air-tightly sealed by the plastic film 2. Further, in the present embodiment, although the entire outer surface of the hardenable resin impregnated bag 1A and a portion (inner peripheral surface)of the flange 1B linking the outer surface of the hardenable resin impregnated bag 1A is covered by the highly air-tight plastic film 2, the plastic film 2 is required to be extended at least 0.5 mm toward the side of the flange 1B from the boundary of the hardenable resin impregnated bag 1A of the tubular resin-absorbent material with the flange 1B.

The above-described tubular resin-absorbent material comprises unwoven fabric such as polyester, polypropylene, acrylic, or the like, and as unhardened liquid hardenable resin to be impregnated therein, thermosetting resin such as unsaturated polyester resin, epoxy resin, vinyl ester resin, or the like may be used. Further, the plastic film 2 is formed in a form of a single or multi-layered seamless tube by the inflation method, and as a material thereof, polyurethane, polyethylene, nylon, ethylene vinyl alcohol, admer, ionomer, vinyl chloride, or the like may be selected. The plastic film 2 is adhered to the entire outer surface of the resin-absorbent material of the hardenable resin impregnated bag 1A and the inner peripheral surface of the resin absorbent material of the flange 1B by heat welding, bonding, or coating.

Further, the flange 1B of the branch pipe liner bag 1 comprises a tubular resin-absorbent material, one end thereof being outwardly folded and broadened out, and the broadened-out portion being impregnated with thermosetting resin such as unsaturated polyester resin, epoxy resin, vinyl ester resin, phenol resin, urethane resin, silicone resin, or the like, and the impregnated portion being hardened beforehand, and the flange 1B is formed in a curved shape of arcuate curvature substantially equivalent to the curvature of a main pipe 10 (refer FIG. 3) to be described later.

In the meantime, the anti-piercing protector 3 comprises metal such as stainless steel (SUS) or the like, ceramic, metallic fiber, carbon fiber, or kevlar fiber, a flange 3a is formed in a shape of arcuate curvature along the shape of the flange 1B at a position in the intermediate height of the outer surface thereof, as illustrated in detail in FIG. 2, and a plurality of circular holes 3a-1 are bored on the flange 3a. Furthermore, the anti-piercing protector 3 has the flange 3a, abutted to the outer surface (downward surface of FIG. 1) of the flange 1B, and fastened to the outer surface of the flange 1B, as illustrated in FIG. 1, by bolts 4 inserted through the flange 1B and the plurality of circular holes 3a-1 and nuts 5 screwed into the bolts 4. At this time, a protrusion 3b (a portion protruding to the inside of the main pipe 10 after the branch pipe is lined) of h1 high located downward of the flange 3a of the anti-piercing protector 3 protrudes to the downward of the flange 1B, and a protrusion 3c (a portion protruding toward the branch pipe 11 after the branch pipe is lined) of h2 high located upward of the flange 3a partially covers to protect the outer surface of the pre-everting hardenable resin impregnated bag 1A. Meanwhile, the height H (=h1+h2) of the anti-piercing protector 3 is set at 0.5 mm or higher.

Next, a pipe lining method according to the present invention will be described with reference to FIGS. 3 to 7. Meanwhile, FIGS. 3 to 7 are cross-sectional views illustrating the pipe lining method according to the present invention in sequence of the steps.

Figure 3:
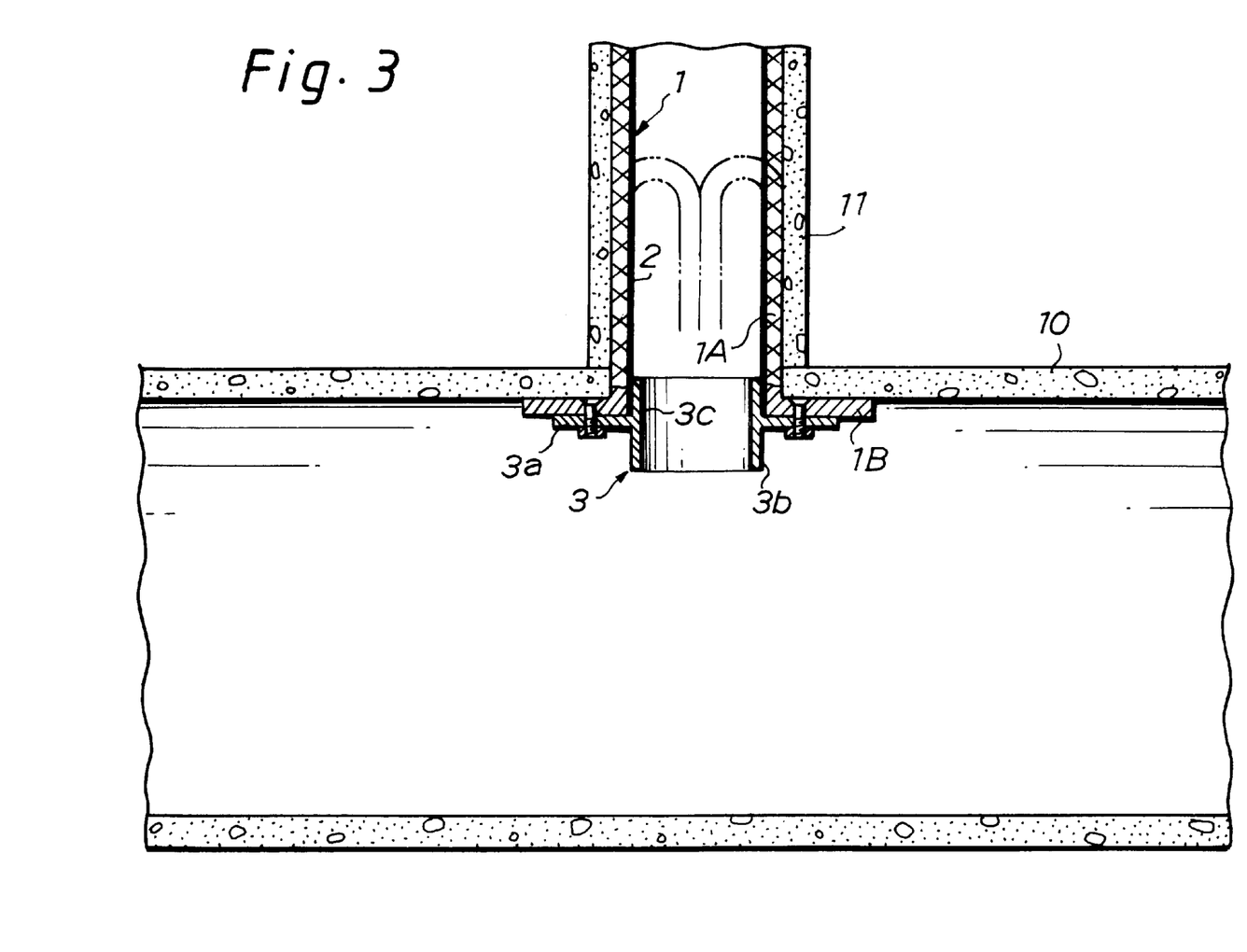
FIG. 3 is a cross-sectional view illustrating a first step of the pipe lining method according to the present invention.

In FIG. 3, a main pipe 10 is connected with a branch pipe 11 of a smaller diameter. In the pipe lining method according to the present invention, after the branch pipe is lined using the branch pipe liner bag 1, the main pipe 10 is lined using a main pipe liner bag 6 to be described later, and the portion of the main pipe liner bag 6 blocking a branch pipe opening is pierced at the last.

To start with, lining of a branch pipe 11 is described.

The branch pipe 11 is lined using a branch pipe liner bag 1, as illustrated in FIG. 1. The branch pipe liner bag is introduced into a main pipe 10 by a working robot (not shown), and in a state a flange 1B is bonded to the circumference of a branch pipe opening of the main pipe 10, as illustrated in FIG. 3, a hardenable resin impregnated bag 1A is everted into the branch pipe 11 from the side of the main pipe 10 toward the ground surface by pressurized fluid such as pressurized air or the like.

When the hardenable resin impregnated bag 1A of the branch pipe liner bag 1 is completely everted into the branch pipe 11 across an entire length thereof, while the hardenable resin impregnated bag 1A remains pressed against the inner wall of the branch pipe 11 by the pressurized fluid applied into the inside of the branch pipe liner bag 1, the hardenable resin impregnated bag 1A is heated to harden the thermosetting resin impregnated therein. By this process, the inner surface of the branch pipe 11 is lined with the hardened branch pipe liner bag 1, and the branch pipe 11 is repaired.

Accordingly, when the branch pipe 11 has been lined, a protrusion 3b of an anti-piercing protector 3 mounted on the flange 1B of the branch pipe liner bag 1 protrudes to the inside of the main pipe 10, as illustrated in FIG. 3, and a protrusion 3c of the anti-piercing protector 3 partially covers to protect the inner peripheral surface of the flange 1B and a portion of the inner peripheral surface of the hardenable resin impregnated bag 1A continuing to the flange 1B.

When the branch pipe 11 has been lined in the manner as described above, the main pipe 10 is subjected to lining.

Figure 4:
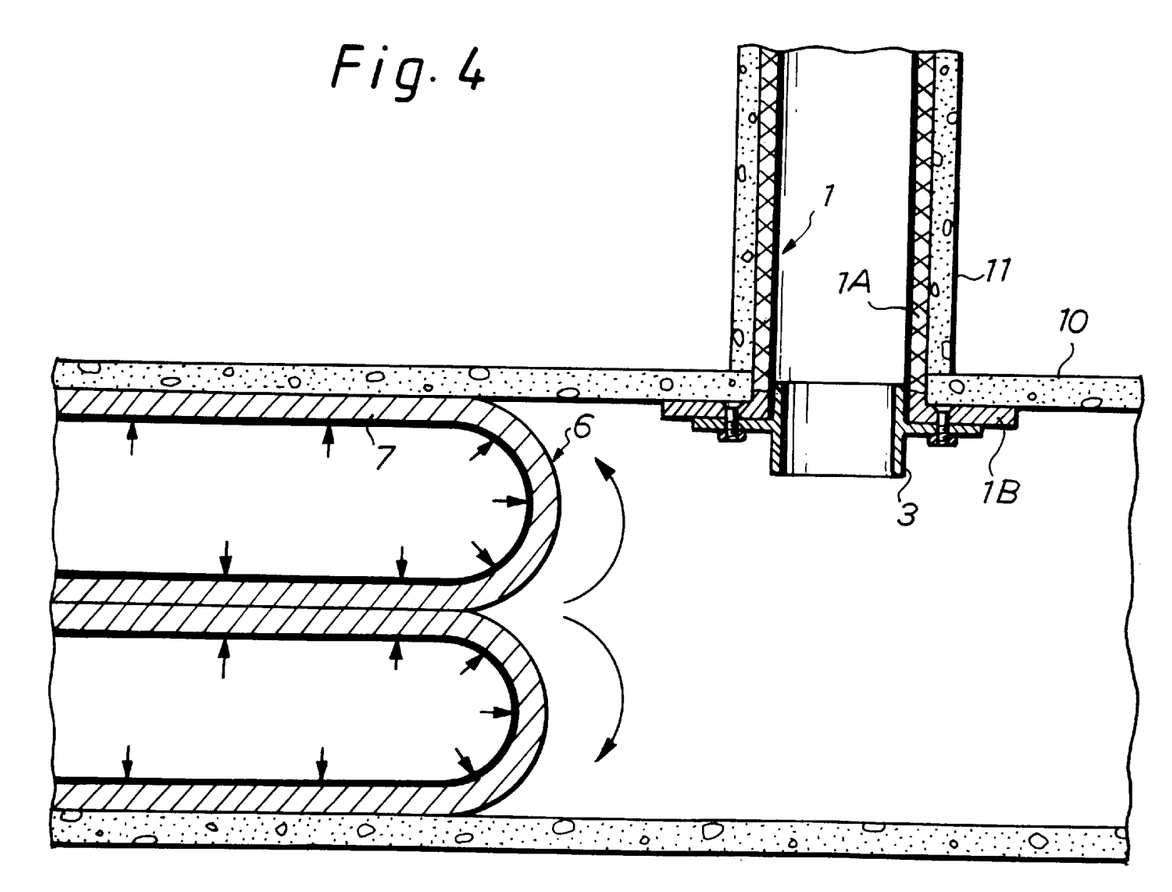
FIG. 4 is a cross-sectional view illustrating a second step of the pipe lining method according to the present invention.

Namely, as illustrated in FIG. 4, a main pipe liner bag 6 is everted into the main pipe 10 by the pressurized fluid such as pressurized air or the like. The main pipe liner bag 6 is made of a resin-absorbent material, an outer surface thereof being covered with a highly air-tight plastic film 7, impregnated with an unhardened liquid hardenable resin. Meanwhile, as for the plastic film 7, the tubular resin-absorbent material, and the liquid hardenable resin, a similar material as used for the branch pipe liner bag 1 can be used.

Figure 5:
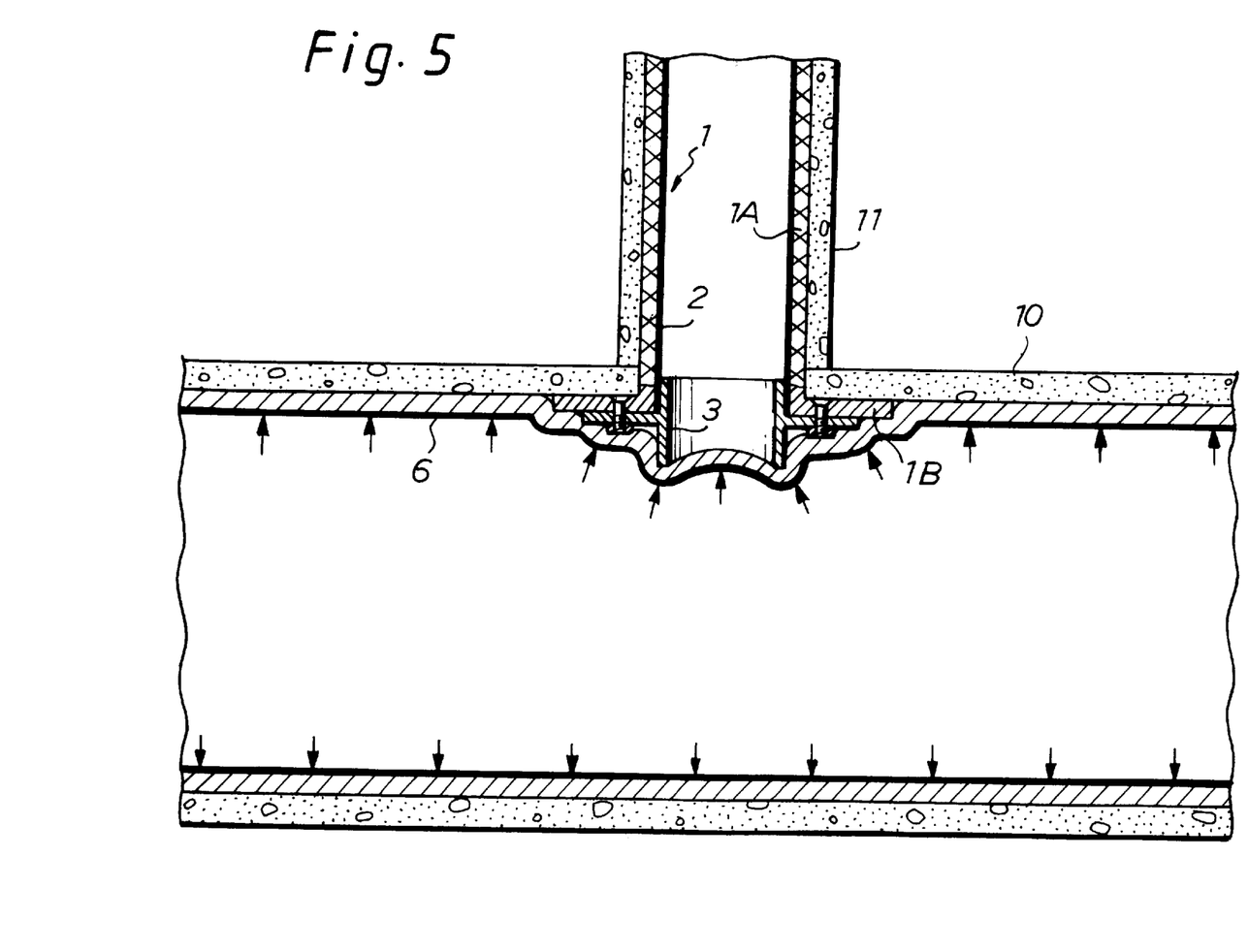
FIG. 5 is a cross-sectional view of a third step of the pipe lining method according to the present invention.

Therefore, as illustrated in FIG. 5, when the main pipe liner bag 6 has been everted into the main pipe 10 across the entire length thereof, the main pipe liner bag 6 is heated by an arbitrary heat medium to harden the thermosetting resin impregnated therein, while the main pipe liner bag 6 remains pressed against the inner wall of the main pipe 10 by the pressurized fluid applied into the inside of the main pipe liner bag 6. Thus, the inner peripheral surface of the main pipe 10 is lined with the hardened main pipe liner bag 6 to have the main pipe 10 repaired, and the flange 1B of the branch pipe 11 is integrally bonded with the main pipe liner bag 6.

By the way, when the inner peripheral surface of the main pipe 10 is lined with the main pipe liner bag 6, the branch pipe opening of the main pipe 10 (a portion of the branch pipe 11 opened to the main pipe 10) is blocked by the main pipe liner bag 6, and the portion of the main pipe liner bag 6 blocking the branch pipe opening requires to be pierced to have the branch pipe 11 communicated with the main pipe 10.

Figure 6:
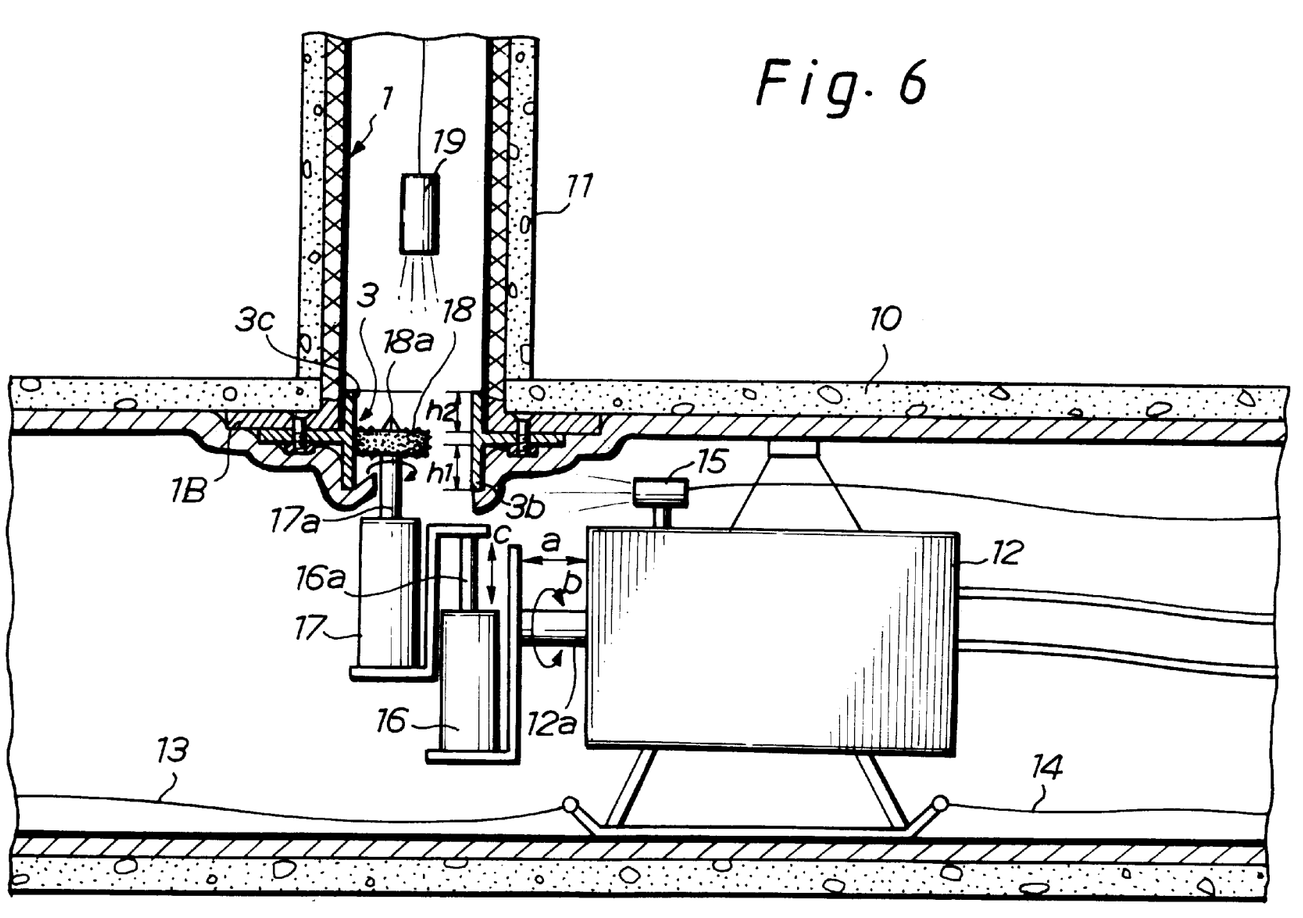
FIG. 6 is a cross-sectional view of a fourth step of the pipe lining method according to the present invention.

In other words, as illustrated in FIG. 6, when piercing the main pipe liner bag 6, a piercing robot 12 is introduced into the main pipe 10. The piercing robot 12 is hydraulically driven, and a head 12a thereof can advance and retreat in the direction indicated by an arrow a in FIG. 6, and rotate in the direction indicated by an arrow b therein. The piercing robot 12 is also connected with pulling ropes 13, 14, and has a monitoring TV camera 15 installed thereon. Further, the piercing robot 12 has a hydraulic cylinder 16 installed on the head 12a thereof, and a hydraulic motor 17 is supported by a rod 16a which is movable upward and downward in the direction of the hydraulic cylinder 16 as indicated by an arrow c. Furthermore, on a output shaft 17a of the hydraulic motor 17, a cutter 18 of an outer diameter smaller than a caliber of the anti-piercing protector 3 is installed. The cutter 18 has cutting-teeth formed on the upper and lower surfaces and the outer peripheral surface thereof, and at the center of the upper surface, a reamer 18a is mounted.

Therefore, while respectively monitoring from the ground surface the inside of the main pipe 10 and the branch pipe 11 using the TV camera 15 provided on the piercing robot 12 and a TV camera 19 introduced into the branch pipe 11, the piercing robot 12 can be moved in the main pipe 10 by a pulling rope 13 or 14 pulled to locate the cutter 18 at a predetermined position. Thereafter, while the hydraulic motor 17 is driven to rotate and drive the cutter 18, if the hydraulic cylinder 16 is driven to move upward the hydraulic motor 17 and the cutter 18, the portion of the main pipe liner bag blocking the branch pipe opening (a part surrounded by the anti-piercing protector 3) is cut by the cutter 18. However, at this time, the inner periphery of the flange 1B of the branch pipe liner bag 1 and a portion of the inner peripheral surface of the hardenable resin impregnated bag 1A are covered and protected by the metallic anti-piercing protector 3, and therefore immune from possible damage caused by the cutter 18, thereby eliminating a trouble, such as infiltration of the underground water into the main pipe 10 from the damaged part, to arise.

Figure 7:
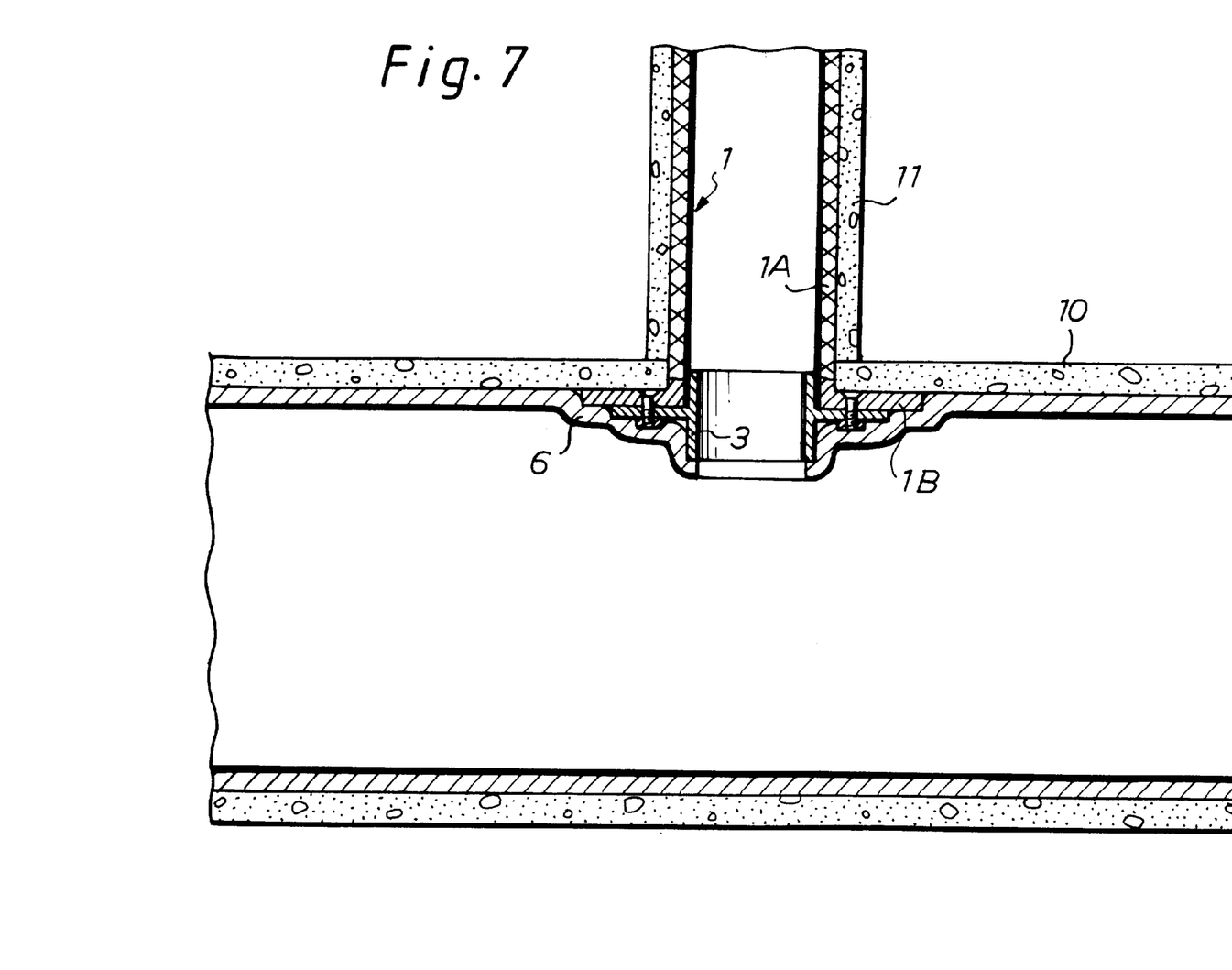
FIG. 7 is a cross-sectional view of a fifth step of the pipe lining method according to the present invention.

Now, if the main pipe liner bag 6 at the branch pipe opening is completely cut by the cutter 18 in the manner as described above, the branch pipe 11 is, as illustrated in FIG. 7, opened to the main pipe 10 making both of the branch pipe 11 and the main pipe 10 communicated.

Figure 8:
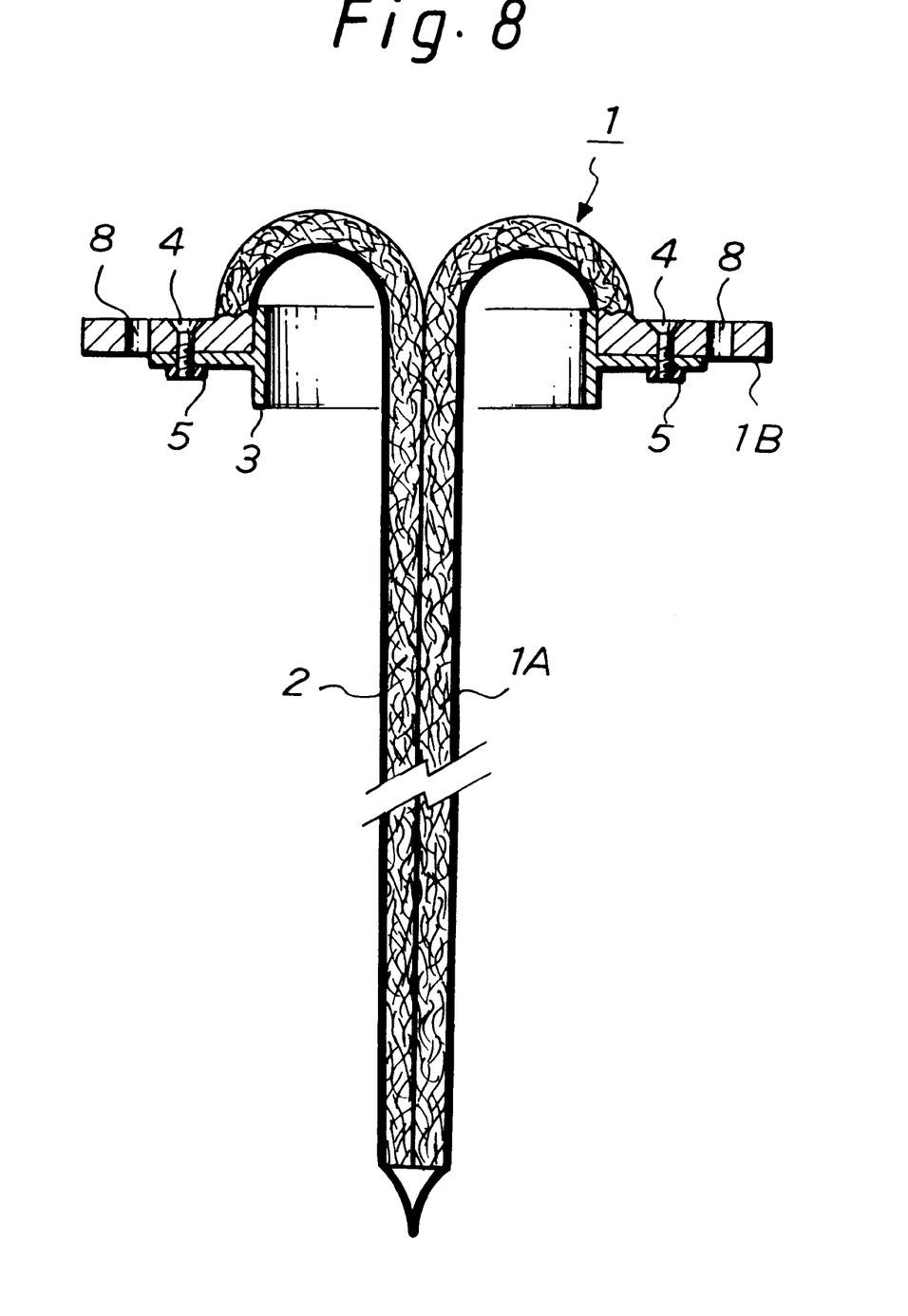
FIG. 8 is a cross-sectional view of a modified example of a branch pipe liner bag according to the present invention.

In the meantime, if the caliber of the main pipe has a diameter larger than 800 m/m enabling a man to enter thereinto, an anti-piercing protector 3 may be mounted after the branch pipe 11 has been completely lined on a flange 1B of a branch pipe liner bag 1 from the side of a main pipe 10. Further, as illustrated in FIG. 8, if a plurality of the circular holes 8 are bored on the flange 1B of the branch pipe liner bag 1, a liquid hardenable resin, seeped out from a main pipe liner bag 6 while the main pipe liner bag 6 is being hardened, flows into the circular holes 8 to harden, thereby the flange 1B of the branch pipe liner bag 1 and the main pipe liner bag 6 are more firmly bonded together to incorporate.

Figure 9:
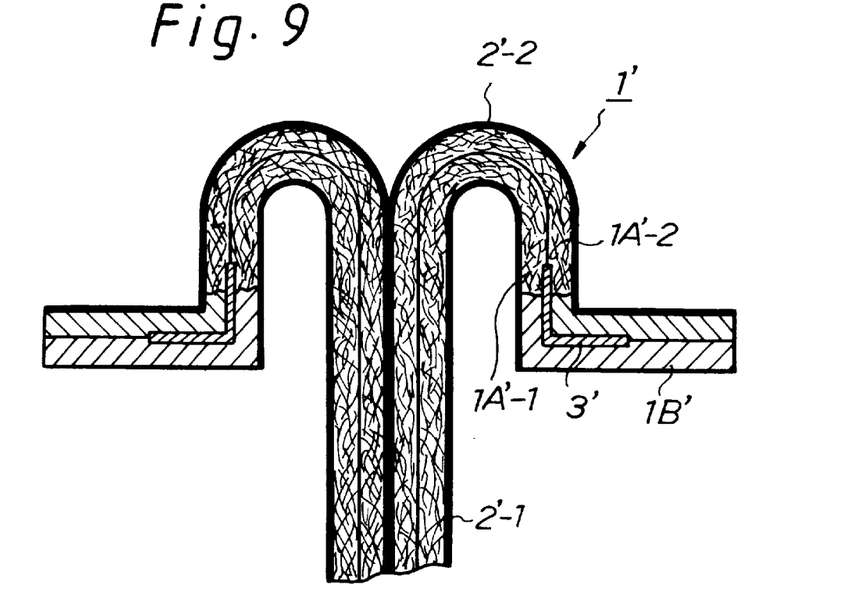
FIG. 9 is a partial cross-sectional view of a branch pipe liner bag according to another embodiment of the present invention.
Figure 10:
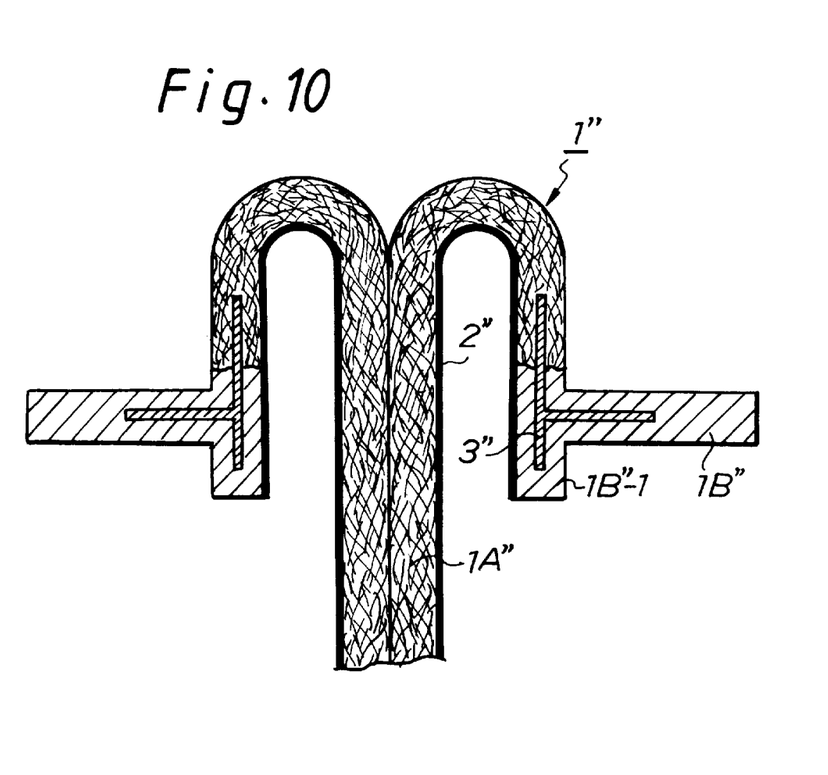
FIG. 10 is a partial cross-sectional view of a branch pipe liner bag according to a further embodiment of the present invention.

In the meantime, in the branch pipe liner bag 1 described above, although the anti-piercing protector 3 is mounted on the flange 1B, the anti-piercing protector 3 may be embedded respectively adjacent to flanges 1B' and 1B", as illustrated in FIGS. 9 and 10. Meanwhile, FIGS. 9 and 10 are partial cross-sectional views respectively of branch pipe liner bags 1' and 1" according to separate embodiments of the present invention.

The branch pipe liner bag 1', as illustrated in FIG. 9, is composed of a double layer structure with a first layer 1A'-1 and a second layer 1A'-2 of a tubular resin-absorbent material comprising unwoven fabric, and respective one ends of the layers 1A'-1 and 1A'-2 are outwardly folded and hardened to constitute a flange 1B'. Further, adjacent to the flange 1B', an anti-piercing protector 3' is sandwiched between the first layer 1A'-1 and the second layer 1A'-2. Meanwhile, the inner peripheral surface of the first layer 1A'-1 and the outer peripheral surface of the second layer 1A'-2 are covered respectively with highly air-tight plastic films 2'-1 and 2'-2.

Therefore, when manufacturing a branch pipe liner bag 1', one end of a first layer 1A'-1 is outwardly folded and broadened out, and over the broadened-out portion, an anti-piercing protector 3' is placed. Further, one end of a second layer 1A'-2 is outwardly folded and broadened out, and the broadened-out portion is placed over the anti-piercing protector 3'. Then, each broadened-out portion of respective layers 1A'-1 and 1A'-2 is impregnated with a hardenable resin, and by hardening the hardenable resin, the branch pipe liner bag 1' having a hardened flange 1B' at one end thereof is obtained, and the anti-piercing protector 3' is embedded adjacent to the flange 1B'.

Also, in a branch pipe liner bag 1" as illustrated in FIG. 10, a protrusion 1B"-1 is formed on an inner periphery of a flange 1B", and in the flange 1B" having the protrusion 1B"-1 formed thereon and a hardenable resin impregnated bag 1A" continuing to the flange 1B", an anti-piercing protector 3" is embedded. Meanwhile, an inner periphery of the hardenable resin impregnated bag 1A" of the tubular resin-absorbent material and the flange 1B" is covered with a highly air-tight plastic film 2", and the plastic film 2 securely prevents pressurized fluid from being leaked from the boundary of the hardenable resin impregnated bag 1A" with the flange 1B".

As will be apparent from the foregoing description, according to the pipe lining method of the present invention implemented using the branch pipe liner bag according to the present invention, after the branch pipe is thus lined, the branch pipe liner bag adjacent to the flange is protected by the anti-piercing protector, thereby making the branch liner bag immune from damage caused thereafter by the cutter in piercing the main pipe liner bag, and a problem such as infiltration of the underground water into the main pipe from the damaged portion can be eliminated.

While the present invention has been described in connection with its preferred embodiments, it is to be understood that various modifications will occur to those skilled in the art without departing from the spirit of the invention. The scope of the present invention is therefore to be determined solely by the appended claims.

What is claimed is:

1. A branch pipe liner bag comprising a tubular member impregnated with an unhardened liquid hardenable resin, said tubular member including a body, a flange formed generally at an end of said body, and a cylindrical anti-piercing protector including at least one portion embedded in said body adjacent to said flange.

2. A branch pipe liner bag according to claim 1, wherein said anti-piercing protector is made of one of metal, ceramic, metallic fiber, carbon fiber and kevlar fiber.

3. A branch pipe liner bag according to claim 1, wherein said anti-piercing protector has a protrusion protruding to the inside of a main pipe after a branch pipe is lined.

4. A branch pipe liner bag according to claim 1, wherein said anti-piercing protector has a protrusion protruding toward a branch pipe after the branch pipe is lined.

5. A branch pipe liner bag according to claim 1, wherein said anti-piercing protector extends to said flange.

6. A branch pipe liner bag according to claim 1, wherein said flange is formed as such that the end portion is broadened out.

7. A branch pipe liner bag according to claim 6, wherein said anti-piercing protector additionally includes a second portion extending to said flange.

8. A branch pipe liner bag according to claim 1, wherein the end of said body is configured to define said flange and a cylindrical projection.

9. A branch pipe liner bag according to claim 8, wherein said anti-piercing protector additionally includes a second portion extending to said flange and a third portion extending to said projection.

10. A branch pipe liner bag according to claim 1, wherein said flange is hardened.

11. A branch pipe liner bag according to claim 1, wherein said tubular member is formed with at least two layers.

12. A branch pipe liner bag according to claim 11, wherein said anti-piercing protector is interposed between said layers.

13. A branch pipe liner bag according to claim 1, wherein said tubular member is made of unwoven fabric.

14. A branch pipe liner bag according to claim 1, wherein an outer surface of said tubular member is covered with an air-tight cover member.

15. A branch pipe liner bag comprising a flexible tubular body soaked with a hardenable liquid resin and adapted to be everted under fluid pressure into a branch pipe so as to extend upwardly from a main pipe toward the ground, a flange being adjoined to an opened end of said tubular body, an fluid-tight film in which said tubular body is contained in a manner such that at least a most part of an outer surface, before eversion, of the tubular body is covered with said film, and an annular protective member being embedded in said tubular body adjacent to said flange.

16. A pipe lining method comprising lining a branch pipe using a branch pipe liner bag, said liner bag including a tubular member impregnated with an unhardened liquid hardenable resin, said tubular member having a flange formed generally at an end portion thereof, and a cylindrical anti-piercing protector being embedded in said tubular member adjacent to said flange, said method further comprising lining a main pipe using a main pipe liner bag made of a tubular resin-absorbent material impregnated with an unhardened liquid hardenable resin; and piercing a portion of said main pipe liner bag blocking a branch pipe opening.

* * * * *